United States Patent [19]

Sishta et al.

[11] Patent Number: 5,852,143
[45] Date of Patent: Dec. 22, 1998

[54] PRODUCTION OF POLYETHYLENE USING STEREOISOMERIC METALLOCENES

[75] Inventors: Purna Chand Sishta, Whitehouse; Eric Paul Wasserman, Hopewell; Frederick John Karol, Belle Mead, all of N.J.

[73] Assignee: Union Carbide Chemicals & Plastics Technology Corporation, Danbury, Conn.

[21] Appl. No.: 838,182

[22] Filed: Apr. 16, 1997

Related U.S. Application Data

[63] Continuation of Ser. No. 442,279, May 16, 1995, abandoned.

[51] Int. Cl.$^6$ ................................................. C08F 4/64
[52] U.S. Cl. .................. 526/127; 526/160; 526/348.4; 526/348.6; 526/352; 526/901; 526/943; 526/119; 502/117; 502/152
[58] Field of Search .................... 526/119, 127, 526/160, 901, 493, 348, 352

[56] References Cited

U.S. PATENT DOCUMENTS

| | | | |
|---|---|---|---|
| 4,794,096 | 12/1988 | Ewen | 502/117 |
| 5,086,134 | 2/1992 | Antberg et al. | 526/126 |
| 5,145,819 | 9/1992 | Winter et al. | 502/117 |
| 5,272,236 | 12/1993 | Lai et al. | 526/348.5 |
| 5,278,272 | 1/1994 | Lai et al. | 526/348.5 |
| 5,304,614 | 4/1994 | Winter et al. | 526/127 |
| 5,314,973 | 5/1994 | Welborn, Jr. | 526/126 |
| 5,317,036 | 5/1994 | Brady, III et al. | 523/223 |
| 5,374,700 | 12/1994 | Tsutsui et al. | 526/348.3 |
| 5,380,810 | 1/1995 | Lai et al. | 526/352 |
| 5,395,471 | 3/1995 | Obijeski et al. | 156/244.11 |
| 5,420,220 | 5/1995 | Cheruvu et al. | 526/348.1 |
| 5,585,448 | 12/1996 | Resconi et al. | 526/170 |
| 5,672,668 | 9/1997 | Winter et al. | 526/127 |
| 5,693,836 | 12/1997 | Winter et al. | 556/11 |

FOREIGN PATENT DOCUMENTS

| | | |
|---|---|---|
| 2017190 | 11/1990 | Canada . |
| 2104036 | 2/1994 | Canada . |
| 0659773 A1 | 6/1995 | European Pat. Off. . |
| 0365974 A2 | 5/1990 | Germany . |
| 0399348 A2 | 11/1990 | Germany . |
| 9308221 | 4/1993 | WIPO . |
| 9407930 | 4/1994 | WIPO . |
| 9428034 | 12/1994 | WIPO . |
| WO95/35333 | 12/1995 | WIPO . |

OTHER PUBLICATIONS

Coates, Geoffrey W. & Robert M. Waymouth, "Oscillating Stereocontrol: A Strategy for the Synthesis of Thermoplastic Elastomeric Polypropylene", *Science*, vol. 267, Jan. 13, 1995, pp. 217–219.

Diamond, Gary M., Stephan Rodewald & Richard F. Jordan, "Efficient Synthesis of rac–(Ethylenebis(indenyl)ZrX$_2$ Complexes via Amine Elimination", *Organometallics*, vol. 14, 1995, pp. 5–7.

Japanese Abstract WO 9419381 A assigned to Idemitsu Kosan Co., Ltd.

Spaleck, Walter, FRank Küber, Andreas Winter, Jürgen Rohrmann, Bernd Bachmann, Martin Antberg, Volker Dolle & Erich F. Paulus, "The Influence of Aromatic Substituents on the Polymerization Behavior of Bridged Zirconocene Catalysts", *Organometallics*, vol. 13, 1994, pp. 954–963.

Giardello, Michael A., Moris S. Eisen, Charlotte L. Stern & Tobin J. Marks, "Chiral, Non–C$_2$ Symmetric Zirconocene Complexes as Catalysts for Stereoregular α–Olefin Polymerization", *J. Am. Chem. Soc.*, vol. 115, 1993, pp. 3326–3327.

Ewen, John A., "Mechanisms of Stereochemical Control in Propylene Polymerization with Soluble Group 4B Metallocene/Methylalumoxane Catalysts", *J. Am. Chem. Soc.*, vol. 106, 1984, pp. 6355–6364.

Kaminsky, Walter, Klaus Külper, Hans H. Brintzinger & Ferdinand R.W.P. Wild, "Polymerization of Propene and Butene with a Chiral Zirconocene and Methylalumoxane as Cocatalyst", *Angew. Chem. Int. Engl.* 24, No. 6, 1985, pp. 507–508.

Wild, Ferdinand R.W.P., Laszlo Zsolnai, Gottfried Huttner & Hans H. Brintzinger, "Synthesis and Molecular Structures of Chiral ansa–Titanocene Derivatives with Bridged Tetrahydroindenyl Ligands", *Journal of Organometallic Chemistry*, vol. 232, 1982, pp. 233–247.

*Primary Examiner*—Jeffrey T. Smith
*Assistant Examiner*—Roberto Rabago
*Attorney, Agent, or Firm*—Sharon H. Hegedus

[57] ABSTRACT

Polyethylene having a broad molecular weight distribution, a narrow comonomer distribution and excellent processability is easily and cost effectively made using stereoisomeric mixtures of bridged metallocene catalysts containing cycloalkadienyl ligands with facial chirality.

5 Claims, No Drawings

5,852,143

PRODUCTION OF POLYETHYLENE USING STEREOISOMERIC METALLOCENES

This application is a Continuation of prior U.S. application Ser. No. 08/442,279, filed May 16, 1995, now abandoned.

This invention relates to production of polyethylene having a broad molecular weight distribution, a narrow comonomer distribution and excellent processability. Such polyethylene is efficiently made using stereoisomeric mixtures of bridged metallocene catalysts containing cycloalkadienyl ligands with facial chirality.

BACKGROUND

Single site catalysts such as metallocenes have received wide attention for their ability to make polyethylene having relatively narrow molecular weight and comonomer distributions at excellent polymerization rates. However, for applications requiring enhanced processability, such as extrudability, metallocene-made polyethylene is deficient due to its narrow molecular weight distribution.

A number of approaches have been proposed to broaden the molecular weight distribution of polyethylene, whether made with metallocenes or traditional Ziegler-Natta catalysts. One is post-reactor or melt blending, in which polyethylene of at least two different molecular weights are blended before or during processing. This procedure suffers from the requirement for complete homogenization and the attendant high cost. A second approach is the use of multi-stage reactors, which also raises questions of efficiency and cost. A third strategy is the direct production of polyethylene having a broad molecular weight distribution using two metallocenes in a single reactor. However, it is often difficult to balance finely the behaviors of two different catalysts in one reactor, making this method somewhat complicated from a practical standpoint.

Another technique for enhancing the processability of polyethylene is the introduction of long chain branching. Polyethylene containing long chain branches possesses good strength and low viscosity under high shear conditions, permitting high processing rates. In addition, polyethylene containing long chain branches often exhibits strain hardening, so that films made from such polyethylene tend not to fail during manufacture.

Copending U.S. application Ser. No. 08/171,272 to Karol et al., filed Dec. 21, 1993, now abandoned, describes the gas phase production of polyethylene containing long chain branches using bridged metallocene catalysts, such as diphenylmethylene(cyclopentadienyl)(fluorenyl)-zirconium dichloride ("DPZ"). Such a process provides polyethylene having an average of up to 3 long chain branches per 1000 main chain carbon atoms.

While it would be desirable to broaden the molecular weight distributions of metallocene-made polyethylene, the narrow comonomer distributions of these polymers advantageously provide good clarity and mechanical strength. Accordingly, there is a need for a process for preparing metallocene-made polyethylene having a broadened molecular weight distribution, while maintaining its advantageously narrow comonomer distribution.

Particular bridged metallocene catalysts containing cycloalkadienyl ligands with facial chirality are known for the polymerization of propylene, a prochiral molecule. It is also known that such catalysts epimerize into their racemic and meso forms in the presence of, for instance, light (Wild, J. Organomet. Chem., 1982, Vol. 232, p. 233) or amines with heating (Diamond et al., Organomet., 1995, Vol. 14, No. 1, p. 5). The racemic form generates isotactic polypropylene, while the meso form produces atactic polypropylene. For discussions of both bridged and unbridged metallocene catalysts used in the stereospecific production of polypropylene, see for example U.S. Pat. No. 5,314,973 to Welborn, Jr.; Ewen, "Mechanisms of Stereochemical Control in Propylene Polymerizations with Soluble Group 4B Metallocene/Methylalumoxane Catalysts", J. Am. Chem. Soc., 1984, Vol. 106, p. 6355; and Kaminsky et al., "Polymerization of Propene and Butene with a Chiral Zirconocene and Methylalumoxane as Cocatalyst", Angew. Chem. Int. Ed. Eng., 1985, Vol. 24, No. 6, p. 507.

Those skilled in the polypropylene art recognize only limited end uses for atactic polypropylene. Accordingly, when bridged metallocene catalysts having cycloalkadienyl ligands with facial chirality are commercially used to make polypropylene, the meso stereoisomer is generally separated out, normally at great cost, to avoid the formation of atactic polypropylene.

U.S. Pat. No. 5,304,614 to Winter et al., and Spaleck et al., "The Influence of Aromatic Substituents on the Polymerization Behavior of Bridged Zirconocene Catalysts", Organomet., 1994, Vol. 13, p. 954, disclose the use of bridged metallocene catalysts having cycloalkadienyl ligands with facial chirality in the production of polypropylene and polyethylene. However, each of these references emphasizes the importance of separating out undesirable meso stereoisomers from the catalyst composition. In the specific examples of these references in which polyethylene was made, none of the catalyst compositions contained more than 6% of the meso stereoisomer. Moreover, the Polydispersity Indexes of the polyethylene made by Winter et al. in their Examples 14–18 were all 2.5 or less, indicating relatively narrow molecular weight distributions. Similarly, Spaleck et al. reported Polydispersity Indexes of less than 3 only.

It has now been discovered that certain bridged metallocene catalysts, namely those having cycloalkadienyl ligands with facial chirality, normally used to make polypropylene, may instead be used to make polyethylene having the unexpected combination of a broad molecular weight distribution, a narrow comonomer distribution and excellent processability. The present process employing these catalysts is simple and cost effective in that a single catalyst in a single reactor is used. And significantly, unlike in the case of polypropylene, there is no need to separate out the meso stereoisomer of these catalysts. Rather, the presence of both the racemic and meso stereoisomers during the polymerization of ethylene is important to the formation of polyethylene having the presently described set of characteristics. The racemic and meso stereoisomers generate polyethylene of different molecular weights but substantially similar comonomer content. Polyethylene produced by a mixture of the racemic and meso stereoisomers of these metallocene catalysts is therefore a substantially homogeneous product having a narrow comonomer distribution and yet a broad molecular weight distribution. Advantageously, applicants have also found that the presence of a methylaluminoxane or modified methylaluminoxane cocatalyst ensures that a mixture of the racemic and meso stereoisomers is present during polymerization.

SUMMARY OF THE INVENTION

The invention provides a process for producing polyethylene, which comprises contacting under gas phase polymerization conditions ethylene and optionally a higher alpha-olefin with a catalyst composition comprising: a) racemic and meso stereoisomers of a bridged metallocene catalyst containing two cycloalkadienyl ligands joined by a bridging linkage and complexed to a metal atom, each cycloalkadienyl ligand having facial chirality, and b) a cocatalyst selected from the group consisting of methylaluminoxane and modified methylaluminoxane; wherein the polyethylene produced has Polydispersity Index of at least about 3.0, a melt index, MI, and a Relaxation Spectrum Index, RSI, such that $(RSI)(MI^\alpha)$ is greater than about 26 when $\alpha$ is about 0.7, and a Crystallizable Chain Length Distribution Index, $L_w/L_n$, of less than about 3, as well as polyethylene produced by the above process.

The invention also provides a new composition consisting essentially of the racemic and meso stereoisomers of dimethylsilylenebis(2-methylindenyl)zirconium dichloride, a process for producing polyethylene, which comprises contacting under gas phase polymerization conditions ethylene and optionally a higher alpha-olefin with a catalyst composition comprising: a) racemic and meso stereoisomers of dimethylsilylenebis(2-methylindenyl)zirconium dichloride, and b) a cocatalyst selected from the group consisting of methylaluminoxane and modified methylaluminoxane; and polyethylene produced by this process. A composition consisting essentially of a mixture of the racemic and meso stereoisomers of dimethylsilylenebis(2-methylindenyl)zirconium dichloride and such composition's use in the gas phase polymerization of ethylene are neither taught nor suggested by the art.

DETAILED DESCRIPTION OF THE INVENTION

Polyethylene produced according to the invention includes ethylene homopolymers, and interpolymers of ethylene and linear of branched higher alpha-olefins containing 3 to about 20 carbon atoms, with densities ranging from about 0.86 to about 0.95. Suitable higher alpha-olefins include, for example, propylene, 1-butene, 1-pentene, 1-hexene, 4-methyl-1-pentene, 1-octene and 3,5,5-trimethyl-1-hexene. Dienes, particularly non-conjugated dienes, may also be polymerized with the ethylene. Suitable non-conjugated dienes are linear, branched, or cyclic hydrocarbon dienes having from about 5 to about 20 carbon atoms. Especially preferred dienes include 1,5-hexadiene, 5-vinyl-2-norbornene, 1,7-octadiene and the like. Polyethylene also includes, for example, ethylene/propylene rubbers (EPR's), ethylene/propylene/diene terpolymers (EPDM's) and the like. Aromatic compounds having vinyl unsaturation, such as styrene and substituted styrenes, may be included as comonomers as well. Particularly preferred polyethylenes contain about 1 to about 40 percent by weight of a comonomer selected from propylene, 1-butene, 1-hexene, and mixtures thereof.

The catalyst composition used in the present invention comprises the racemic and meso stereoisomers of a bridged metallocene catalyst containing two cycloalkadienyl ligands joined by a bridging linkage and complexed to a metal atom. Preferably the metal atom is titanium, zirconium, or hafnium. More preferably, the metal atom is zirconium.

Each of the cycloalkadienyl ligands of the bridged metallocene catalyst has facial chirality. Chirality is used to describe asymmetric molecules or ligands whose mirror images are non-superimposable (i.e., having "handedness"). In the simplest case, there is a chiral center. In the following case the chiral center is the carbon atom:

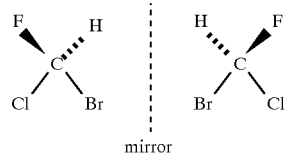

mirror

In cyclic systems a plane of chirality may exist, giving rise to facial chirality. To illustrate the concept of facial chirality, the indenyl ligand is used as an example. An indenyl ligand may be viewed as a cyclopentadienyl ligand containing two substituents that are connected to form a 6-carbon ring. An unsubstituted indenyl (i.e., a cyclopentadienyl ligand containing only the two substituents that form the 6-member ring) has no chirality. If a chiral substituent is attached to the indenyl ligand, the ligand is described in terms of the chirality of the substituent's chiral center. However, if one or more achiral substituents are attached to the indenyl ligand, and there is no mirror plane of symmetry, the substituted indenyl ligand (the cyclopentadienyl ligand containing the two substituents connected to form the 6-member ring plus one or more additional achiral substituents) is then said to have facial chirality:

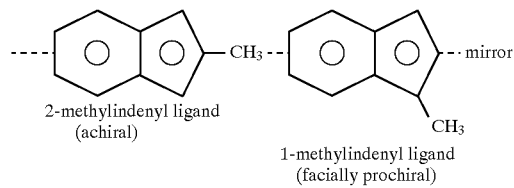

2-methylindenyl ligand (achiral)

1-methylindenyl ligand (facially prochiral)

Thus, the 2-methylindenyl ligand above has no chirality (facial or otherwise) but 1-methylindenyl ligand has facial prochirality The term facial chirality implies a plane of chirality exists which incorporates the indenyl ligand. A metal (M) can coordinate to one of the two chiral faces of the 1-methylindenyl ligand, forming a basis for discrimination between the two prochiral faces. This forms the enantiomers:

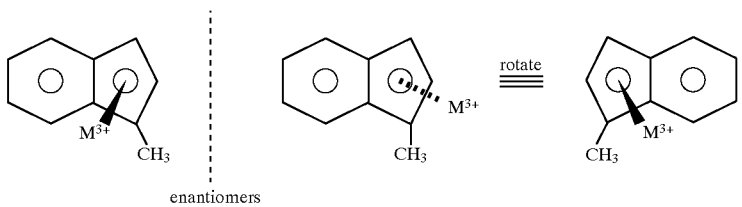

enantiomers

When there are two such ligands in a molecule, each having facial chirality and coordinated to a metal, four possible stereoisomers result: the metal can coordinate to the R face of each ligand (R, R') or the S face of each ligand (S, S') or it can coordinate to one of each face (R, S' and S, R'), wherein R, R', S, and S' refer to the absolute configurations of the ligands. The R, R' and S, S' stereoisomers are collectively called the racemic stereoisomers, while the R, S' and S, R' stereoisomers are called the meso stereoisomers.

To produce polyethylene of the invention having a broadened molecular weight distribution, a narrow comonomer distribution, and excellent processability, it is necessary that both the racemic and meso stereoisomers be present in the catalyst composition in greater than trivial amounts. This is in contrast to the catalyst compositions normally used in the production of polypropylene, in which very little or no meso stereoisomer is present in order to avoid the formation of atactic polypropylene. Preferably, both the racemic and meso stereoisomers are present during polymerization in an amount greater than about 6, more preferably 10, percent by weight of the total amount of bridged metallocene catalyst containing cycloalkadienyl ligands having facial chirality. Such amount is independent of the ratio of racemic stereoisomer to meso stereoisomer present in the bridged metallocene catalyst containing cycloalkadienyl ligands with facial chirality before it is combined with the methylaluminoxane or modified methylaluminoxane cocatalyst to form the activated catalyst composition.

In a preferred embodiment of the invention, the bridged metallocene catalyst containing two cycloalkadienyl ligands with facial chirality has the formula:

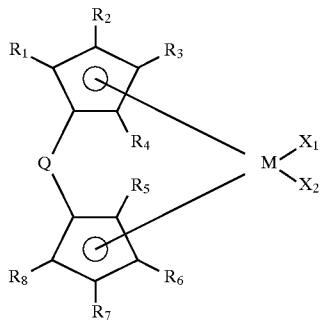

wherein $R_1$ to $R_8$ are the same or different monovalent substituents selected from alkyl, aryl, alkylaryl, arylalkyl, hydrogen, halogen, or hydrocarboxy and any two of $R_1$ to $R_8$ may be connected to form a ring of 4–8 atoms, such that if $R_1$=$R_4$ then $R_2$≠$R_3$, and if $R_2$=$R_3$ then $R_1$≠$R_4$, and if $R_5$=$R_8$ then $R_6$≠$R_7$, and if $R_6$=$R_7$ then $R_5$≠$R_8$, the symbol "=" denoting both chemical and stereochemical equivalence;

Q is a divalent substituent selected from alkylidene, dialkylsilylene, dialkylgermylene, and cycloalkylidene;

M is transition metal selected from Group 4, and is preferably zirconium or hafnium; and $X_1$ and $X_2$ are the same or different, and are monovalent ligands selected from alkyl, aryl, alkylaryl, arylalkyl, hydrogen, halogen, hydrocarboxy, aryloxy, dialkylamido, carboxylato, thiolato, and thioaryloxy.

The following compounds are illustrative but non-limiting examples of useful bridged metallocene catalysts containing two cycloalkadienyl ligands with facial chirality: dimethylsilylenebis(indenyl)zirconium dichloride, ethylenebis(indenyl)zirconium dichloride, dimethylsilylenebis(4,5,6,7-tetrahydroindenyl)zirconium dichloride, ethylenebis(4,5,6,7-tetrahydroindenyl) zirconium dichloride, dimethylsilylenebis(2-methylindenyl)zirconium dichloride, dimethylsilylenebis(2-methyl-4,5,6,7-tetrahydroindenyl)zirconium dichloride, methylphenylsilylenebis(2-methylindenyl)zirconium dichloride, dimethylsilylenebis(2,4,7-trimethylindenyl) zirconium dichloride, ethylenebis(2-methylindenyl) zirconium dichloride, ethylenebis(2-methyl-4,5,6,7-tetrahydroindenyl)zirconium dichloride, dimethylsilylenebis(2-methylindenyl)zirconium dichloride, dimethylsilylenebis(2-methyl-4-phenylindenyl)zirconium dichloride, dimethylsilylenebis(2-methyl-4-isopropylindenyl)zirconium dichloride, dimethylsilylenebis(2-methyl-4-naphthylindenyl) zirconium dichloride, dimethylsilylenebis(2-methylindenyl)zirconium chloride phenoxide, dimethylsilylenebis(2-methylindenyl)zirconium diphenoxide, dimethylsilylenebis(2-methylindenyl) zirconium bis(dimethylamide), dimethylsilylenebis(2-methylindenyl)zirconium bis(benzoate), dimethylsilylenebis(2-methylindenyl)zirconium chloride ethoxide, dimethylsilylenebis(2-methylindenyl) zirconium diethoxide, dimethylsilylenebis(2-methylindenyl)zirconium bis(cyclohexanoxide), dimethylsilylenebis(2-methylindenyl)zirconium catecholate, dimethylsilylenebis(2,4-dimethylcyclopentadienyl)zirconium dichloride, dimethylsilylenebis(2-methyl-4-t-butylcyclopentadienyl) zirconium dichloride, and ethylenebis(2,4-dimethylcyclopentadienyl)zirconium dichloride.

Preferably, the bridged metallocene catalyst is dimethylsilylene-bis(2-methylindenyl)zirconium dichloride. Dimethylsilylenebis(2-methylindenyl)zirconium dichloride is defined by the formula immediately above when $R_1$ and $R_5$ are each methyl; $R_2$ and $R_6$ are each hydrogen; $R_3$ and $R_4$ connect to form —CH═CH—CH═CH—; $R_7$ and $R_8$ connect to form —CH═CH—CH═CH—; Q is dimethylsilylene; M is zirconium; and $X_1$ and $X_2$ are each chloride. A mixture of the racemic and meso stereoisomers of dimethylsilylenebis(2-methylindenyl)zirconium dichloride is especially useful in preparing catalyst compositions that produce polyethylene having highly desirable properties.

The bridged metallocene catalyst may be made by one of several methods. The method of manufacture is not critical. For example, see A. Razavi and J. Ferrara, *J. Organomet. Chem.*, 435, 299 (1992) and K. P. Reddy and J. L. Petersen, *Organometallics*, 8, 2107 (1989). One method comprises first reacting two equivalents of an optionally substituted cyclopentadiene with a metallic deprotonating agent such as an alkyllithium or potassium hydride in an organic solvent such as tetrahydrofuran, followed by reaction of this solution with a solution of one equivalent of a doubly-halogenated compound such as dichlorodimethylsilane. The resulting ligand is then isolated by conventional methods known to those skilled in the art (such as distillation or liquid chromatography), reacted with two equivalents of a metallic deprotonating agent as above, and then reacted with one equivalent of a tetrachloride of titanium, zirconium, or hafnium, optionally coordinated with donor ligand molecules such as tetrahydrofuran, in organic solvent. The resulting bridged metallocene catalyst is isolated by methods known to those skilled in the art such as recrystallization or sublimation.

Alternatively, the bridged metallocene catalyst may be produced by first reacting one equivalent of an optionally substituted cyclopentadiene with one equivalent of metallic deprotonating agent in an organic solvent as above, followed by reaction with one equivalent of a molecule containing an unsaturated five-carbon ring to which is attached an exocyclic group susceptible to nucleophilic attack, such as a dialkylfulvene. The reactive solution is next quenched with water and the ligand is isolated by conventional methods. One equivalent of the ligand is next reacted with two equivalents of metallic deprotonating agent as above and the resulting solution is in turn reacted with one equivalent of a tetrachloride of titanium, zirconium, or hafnium optionally coordinated with donor ligand molecules such as tetrahydrofuran, in organic solvent. The resulting bridged metallocene catalyst is isolated by methods known to those skilled in the art.

The cocatalyst is methylaluminoxane (MAO) or modified methylaluminoxane (MMAO). Aluminoxanes are well known in the art and comprise oligomeric linear alkyl aluminoxanes represented by the formula:

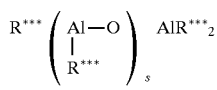

and oligomeric cyclic alkyl aluminoxanes of the formula:

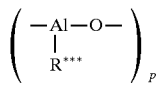

wherein s is 1–40, preferably 10–20; p is 3–40, preferably 3–20; and R* is an alkyl group containing 1 to 12 carbon atoms, preferably methyl or an aryl radical such as a substituted or unsubstituted phenyl or naphthyl radical. In the case of methylaluminoxane, R* in the two formulas immediately above is methyl. For modified methylaluminoxane, R* is a mix of methyl and $C_2$ to $C_{12}$ alkyl groups, wherein methyl comprises about 20 to about 80 percent by weight of the R* groups.

Aluminoxanes may be prepared in a variety of ways. Generally, a mixture of linear and cyclic aluminoxanes is obtained in the preparation of aluminoxanes from, for example, trimethylaluminum and water. For example, an aluminum alkyl may be treated with water in the form of a moist solvent. Alternatively, an aluminum alkyl, such as trimethylaluminum, may be contacted with a hydrated salt, such as hydrated ferrous sulfate. The latter method comprises treating a dilute solution of trimethylaluminum in, for example, toluene with a suspension of ferrous sulfate heptahydrate. It is also possible to form methylaluminoxanes by the reaction of a tetraalkyl-dialuminoxane containing $C_2$ or higher alkyl groups with an amount of trimethylaluminum that is less than a stoichiometric excess. The synthesis of methylaluminoxanes may also be achieved by the reaction of a trialkyl aluminum compound or a tetraalkyldialuminoxane containing $C_2$ or higher alkyl groups with water to form a polyalkyl aluminoxane, which is then reacted with trimethylaluminum. Further modified methylaluminoxanes, which contain both methyl groups and higher alkyl groups, may be synthesized by the reaction of a polyalkyl aluminoxane containing $C_2$ or higher alkyl groups with trimethylaluminum and then with water as disclosed in, for example, U.S. Pat. No. 5,041,584.

The amount of bridged metallocene catalyst and cocatalyst usefully employed in the catalyst composition may vary over a wide range. Preferably, the catalyst composition is present at a concentration sufficient to provide at least about 0.000001, preferably at least about 0.00001, percent by weight of transition metal based on the total weight of ethylene and other monomers. The mole ratio of aluminum atoms contained in the methylaluminoxane or modified methylaluminoxane to metal atoms contained in the bridged metallocene catalyst is generally in the range of about 2:1 to about 100,000:1, preferably in the range of about 10:1 to about 10,000:1, and most preferably in the range of about 30:1 to about 2,000:1.

The catalyst composition may be supported or unsupported. In the case of a supported catalyst composition, the bridged metallocene catalyst and the cocatalyst may be impregnated in or deposited on the surface of an inert substrate such as silicon dioxide, aluminum oxide, magnesium dichloride, polystyrene, polyethylene, polypropylene, or polycarbonate, such that the catalyst composition is between 1 and 90 percent by weight of the total weight of the catalyst composition and the support.

Polymerization is conducted in the gas phase in a stirred or fluidized bed reactor, using equipment and procedures well known in the art. Preferably, superatmospheric pressures in the range of 1 to 1000 psi, preferably 50 to 400 psi, and most preferably 100 to 300 psi, and temperatures in the range of 30° to 130° C., preferably 65° to 110° C. are used. Ethylene and other monomers, if present, are contacted with an effective amount of catalyst composition at a temperature and a pressure sufficient to initiate polymerization. At least a temperature of 55° C. is required for the appreciable onset of epimerization.

Suitable gas phase polymerization reaction systems comprise a reactor to which monomer(s) and catalyst composition may be added, and that contain a bed of forming polyethylene particles. The invention is not limited to any specific type of gas phase reaction system. As an example, a conventional fluidized bed process is conducted by passing a gaseous stream containing one or more monomers continuously through a fluidized bed reactor under reaction conditions and in the presence of catalyst composition at a velocity sufficient to maintain the bed of solid particles in a suspended condition. The gaseous stream containing unreacted gaseous monomer is withdrawn from the reactor continuously, compressed, cooled and recycled into the reactor. Product is withdrawn from the reactor and make-up monomer is added to the recycle stream.

Conventional additives may be included in the process, provided they do not interfere with the epimerization of racemic and meso stereoisomers of the bridged metallocene catalyst.

When hydrogen is used as a chain transfer agent in the process, it is used in amounts varying between about 0.001 to about 10 moles of hydrogen per mole of total monomer feed. Also, as desired for temperature control of the system, any gas inert to the catalyst composition and reactants can also be present in the gas stream.

Organometallic compounds may be employed as scavenging agents for poisons to increase the catalyst activity. Examples of these compounds are metal alkyls, preferably aluminum alkyls, most preferably trisobutyl-aluminum tri-n-hexyl aluminum. Use of such scavenging agents is well known in the art.

Polyethylene produced according to the invention suprisingly has a broadened molecular weight distribution relative to known polyethylene. In particular, the polyethylene has a Polydispersity Index uncorrected for long chain branching of at least about 3.0, preferably at least about 4.0, indicating that this polyethylene has a molecular weight distribution that is advantageously quite broad. The Polydispersity Index (PDI) of a polymer is defined as the ratio of the weight average molecular weight of the polymer to the number average molecular weight of the polymer ($M_w/M_n$). PDI, uncorrected for long chain branching is determined using size exclusion chromatography (SEC) using a Waters 150C GPC instrument operating at 140° C. with 1,2,4-trichlorobenzene at a flow rate of 1 ml/min. The pore size range of the column set provides for a MW separation covering the 200 to 10,000,000 Daltons range. National Institute of Standards Technology polyethylene standard NBS 1475 or 1496 is used as the calibration standard to obtain the uncorrected (linear polymer assumed) molecular weight distribution.

The present polyethylene has unique rheological properties that impart superior melt strength and shear-thinning behavior, enabling it to process extremely easily. Such enhanced processability encompasses ease in both extrusion and fabrication processes, such as in blown film, blow molding, extrusion coating and wire and cable extrusion operations. In particular, the polyethylene has melt indices, MI, and Relaxation Spectrum Indices, RSI, such that:

$$(RSI)(MI^\alpha) > \text{about 26 when } \alpha \text{ is about 0.7.}$$

Preferably, $$(RSI)(MI^\alpha) > \text{about 30 when } \alpha \text{ is about 0.7.}$$

In the formulas immediately above, MI is the melt index of the polymer reported as grams per 10 minutes, determined in accordance with ASTM D-1238, condition E, at 190° C., and RSI is the Relaxation Spectrum Index of the polymer in dimensionless units.

The RSI of the polyethylene is determined by first subjecting the polymer to a shear deformation and measuring its response to the deformation using a rheometer. As is known in the art, based on the response of the polymer and the mechanics and geometry of the rheometer used, the relaxation modulus G(t) or the dynamic moduli G'(w) and G"(w) may be determined as functions of time t or frequency w, respectively. (See J. M. Dealy and K. F. Wissbrun, *Melt Rheology and Its Role in Plastics Processing*, Van Nostrand Reinhold, 1990, pp. 269–297). The mathematical connection between the dynamic and storage moduli is a Fourier transform integral relation, but one set of data may also be calculated from the other using the well known known relaxation spectrum. (See S. H. Wasserman, *J. Rheology*, Vol. 39, pp. 601–625 (1995)). Using a classical mechanical model a discrete relaxation spectrum consisting of a series of relaxations or "modes," each with a characteristic intensity or "weight" and relaxation time may be defined. Using such a spectrum, the moduli are re-expressed as:

$$G'(\omega) = \sum_{i=1}^{N} g_i \frac{(\omega\lambda_i)^2}{1+(\omega\lambda_i)^2}$$

$$G''(\omega) = \sum_{i=1}^{N} g_i \frac{\omega\lambda_i}{1+(\omega\lambda_i)^2}$$

$$G(t) = \sum_{i=1}^{N} g_i \exp(-t/\lambda_i)$$

where N is the number of modes and $g_i$ and $\lambda_i$ are the weight and time for each of the modes. (See J. D. Ferry, *Viscoelastic Properties of Polymers*, John Wiley & Sons, 1980, pp. 224–263.) A relaxation spectrum may be defined for the polymer using software such as IRIS® rheological software, which is commercially available from IRIS Development. Once the distribution of modes in the relaxation spectrum is calculated, the first and second moments of the distribution, which are analogous to $M_n$ and $M_w$, the first and second moments of the molecular weight distribution, are calculated as follows:

$$g_I = \sum_i g_i / \sum_i g_i/\lambda_i$$

$$g_{II} = \sum_i g_i\lambda_i / \sum_i g_i$$

RSI is defined as $g_{II}/g_I$.

Because RSI is sensitive to such parameters as a polymer's molecular weight distribution, molecular weight, and long chain branching, it is a reliable indicator of the processablity of a polymer. The higher the value of RSI, the better the processability of the polymer.

In addition, the polyethylene has a Crystallizable Chain Length Distribution Index, $L_w/L_n$, of less than about 3, preferably less than about 2, indicative of comonomer distributions and therefore substantial compositional homogeneity. The Crystallizable Chain Length Distribution Index is determined using Temperature Rising Elution Fractionation (TREF), as described in Wild et al., *J. Polymer Sci. Poly. Phys. Ed.*, Vol. 20, p. 441 (1982). A dilute solution of the polymer in a solvent such as 1,2,4-trichlorobenzene, at 1–4 mg/ml, is loaded at high temperature onto a packed column. The column is then allowed to slowly cool down at 1° C./hr. to ambient temperature in a controlled manner so that the polymer is crystallized onto the packing in the order of increasing branching (or decreasing crystallinity) with the decreasing temperature. The column is then heated in a controlled manner at 0.75° C./min to above 140° C. with a constant solvent flow at 2 ml/min through the column. The polymer fractions as they are eluted have decreasing branching (or increasing crystallinity) with the increasing temperature. An infrared concentration detector is used to monitor effluent concentrations. From the TREF temperature data, the branch frequency may be obtained for a given comonomer. Consequently, the main chain lengths between branches, expressed as $L_w$ and $L_n$, may be calculated as follows. $L_w$ is the weight average chain length between branches:

$$L_w = \Sigma_i w_i L_i$$

and $L_n$ is the number average chain length between branches:

$$L_n = 1/\Sigma_i(w_i/L_i),$$

wherein $w_i$ is the weight fraction of the polymer component i having an average backbone chain spacing $L_i$ between two adjacent branch points.

Another preferred characteristic of the present polyethylene is that it contains at least about 0.3 long chain branches per 1000 main chain carbon atoms. This further contributes to its excellent processability. Preferably, the polyethylene contains at least about 0.5 long chain branches per 1000 main chain carbon atoms. More preferably, the polyethylene contains at least about 0.7 long chain branches per 1000 main chain carbon atoms. Long-chain branching or LCB is measured by coupled size exclusion chromatography (SEC) with solution viscometry using the Waters 150C GPC instrument (Waters Associates) with an on-line differential viscometer made by Viscotek Corporation using the same experimental conditions as described elsewhere for standard size exclusion chromatography. A polyethylene standard of known molecular weight distribution and intrinsic viscosity in 1,2,4-trichlorobenzene at 140° C., such as NBS 1475 or 1496, is used for obtaining the calibration. The LCB values are derived from the viscosity ratio of the branched polymer to linear polymer of same molecular weight. (See Mirabella, F. M., Jr.; and Wild, L., *Polymer Characterization, Amer. Chem. Soc. Symp. Ser.* 227, 190, p. 23.) An epsilon value of 0.75 is used in relating the viscosity ratio to the ratio of mean-square radius of gyration of the branched polymer to linear polymer also at same molecular weight. (See Foster, G. N., MacRury, T. B., Hamielec, A. E., *Liquid Chromatography of Polymer and Related Materials II*, Ed. - J. Cazes and X. Delamere, Marcel Dekker, New York) This ratio of radii of gyration is used in the LCB calculations per the Zimm-Stockmayer relationship (Zimm, B. H. and Stockmayer, W. H., J. Chem. Phys., vol. 17, p. 1301, 1949), as described in *Developments in Polymer Characterization - 4*, Dawkins, J. V., ed., Applied Science, Barking, 1993.

The polyethylene may be blended with other polymers and resins as desired using techniques known in the art. In addition, various additives and agents, such as thermo- and photo-oxidation stabilizers, hindered phenolic antioxidants, hindered amine light stabilizers, crosslinkers such as dicumyl peroxide, colorants including carbon blacks and titanium dioxide, lubricants such as metallic stearates, processing aids such as fluoroelastomers, slip agents such as oleamide or erucamide, film antiblock or release agents such as controlled particle size talc or silica, blowing agents, flame retardants, and other conventional materials may be mixed with the polyethylene as desired.

The polyethylene is useful for fabrication into a variety of finished articles such as films including clarity films and shrink films, extrusion coatings, wire and cable insulation and jacketing, crosslinked, power cable insulation, molded articles made by injection molding, blow molding, or rotational molding, and insulating and semiconductive jacketing and/or shields. Methods of making such articles are well known in the art.

The following examples further illustrate the invention.

EXAMPLES

Glossary

Catalyst activity is given in kg/mmol Zr·hr·100 psi ethylene.

FI is the flow index, reported as grams per 10 minutes, is determined in accordance with ASTM D-1238, condition F, and is measured at ten times the weight used in the melt index text.

$L_w/L_n$ stands for Crystallizable Chain Length Distribution Index, described above. TREF measurements were made as described above.

MFR is the melt flow ratio, which is the ratio of flow index to melt index. It is related to the molecular weight distribution of the polymer.

MI is the melt index, reported as grams per 10 minutes, determined in accordance with ASTM D-1238, condition E, at 190° C.

Molecular Weights, Molecular Weight Distribution, and Long Chain Branching (LCB) were determined by size exclusion chromatography as follows. A WATERS 150C GPC chromatograph equipped with mixed-pore size columns for molecular weight measurements and a VISCOTEK 150R viscometer for on-line viscosity measurements were employed. For the size exclusion chromatograhy (SEC), a 25 cm long preliminary column from Polymer Labs having a 50 Å nominal pore size, followed by three 25 cm long Shodex A-80 M/S (Showa) columns to affect a molecular weight separation for linear ethylene polymer from about 200 to 10,000,000 Daltons were used. Both columns were of a styrenedivinyl benzene-like material. 1,2,4,-trichlorobenzene was used as the solvent to prepare the polymer solutions and the chromatographic eluent. All measurements were made at a temperature of 140°±0.5° C. The analog signals from the mass and viscosity detectors were collected into a computer system. The collected data were then processed using standard software commercially available from several sources (Waters Corporation and Viscotek Corporation) for uncorrected molecular weight distribution. The calibration uses the broad MWD calibrant method. (See W. W. Yau, J. J. Kirkland and D. D. Bly, *Modern Size-Exclusion Liquid Chromatograhy*, Wiley, 1979, p. 289–313. For the latter, two MW related statistics such as number and weight average MW values must be known for the polymer calibrant. Based on the MW calibration, elution volume is converted to molecular weight for the assumed linear ethylene polymer.

A detailed discussion of the methodology of the SEC-Viscometry technique and the equations used to convert SEC and viscometry data into long-chain branching and corrected molecular weights is given in the article by Mirabella and Wild referred to above.

Rheological measurements were done via dynamic oscillatory shear experiments conducted with a new Weissenberg Rheogoniometer commercially available from TA Instruments. Experiments were run in parallel plate mode under a nitrogen atmosphere at 190° C. Sample sizes ranged from approximately 1100 to 1500 mm and were 4 cm in diameter. The frequency sweep experiments covered a frequency range of 0.1 to 100 sec$^{-1}$ with a 2% strain amplitude. The torque response was converted by the TA Instruments rheometer control software to dynamic moduli and dynamic viscosity data at each frequency. Discrete relaxation spectra were fit to the dynamic moduli data for each sample using the IRIS® commercial software package.

Process operability was evaluated by production rates and polymer morphology. Good operability indicates continuous high productivity and no chips or chunks, or process upsets and a high bulk density, while poor operability indicates that continuous operation was not feasible due to extensive particle agglomeration.

Slurry Polymerization (Comparative Examples A–D)

Referring to Table 1 below, in Comparative Examples A–D, polyethylene samples were made using catalyst compositions comprising a mixture of the racemic and meso stereoisomers of dimethylsilylenebis(2-methylindenyl) zirconium dichloride ($Me_2Si(2-MeInd)ZrCl_2$), a bridged metallocene catalyst containing two cycloalkadienyl ligands having facial chirality, in a slurry phase reactor as follows. These Examples illustrate that only relatively narrow molecular weight distribution polyethylene was produced in the slurry phase.

Example A

In a 4-oz glass bottle were mixed 50 mL of nitrogen-sparged hexane and 0.25 mL of a 2.0 mol/L solution of methylaluminoxane (MAO) in toluene ($5 \times 10^{-4}$ moles Al, obtained from Ethyl Corp.). The contents of this bottle were transferred into a 1.6 liter stainless steel autoclave reactor equipped with a mechanical agitator, after which a mixture of 26 mL 1-hexene and 600 mL additional hexane was added. Next, 0.2 standard liters of hydrogen were admitted to the reactor, followed by ethylene, which caused the total reactor pressure to rise to 150 psi as the internal temperature was raised to 85° C. At this point, 0.84 mL of a solution made from 6 mg Me$_2$Si(2-MeInd)ZrCl$_2$ (initial isomer ratio rac/meso≈30, obtained from Boulder Scientific) in 10.5 mL toluene (1×10$^{-6}$ moles) was injected by syringe into the reactor, initiating polymerization. Polymerization was terminated after 13 min. by venting the reactor and cooling its contents. The polymer was recovered by blending the reactor contents with a mixture of isopropyl and methyl alcohol and filtering. The polymer was then dried for at least 15 h in partial vacuum at about 40° C. From this reaction were obtained 43.9 g polyethylene of melt index 11.1 dg/min, flow index 311 dg/min, and SCB/1000C (determined by IR spectroscopy) of 33. SEC-estimated M$_w$=47,500 g/mole and M$_w$/M$_n$=2.6.

Example B

The same procedure was employed as in Example A, except that the amount of MAO solution employed was 1 mL (2×10$^{-3}$ moles Al), the initial isomer ratio of the metallocene catalyst was rac/meso≈0.2, and the reaction proceeded for 10 min. Polymer yield=47.2 g; melt index=25.3 dg/min; flow index=720 dg/min; M$_w$=40,900 g/mole; M$_w$/M$_n$=2.4; SCB/1000C (by IR spectroscopy)=45.

Example C

The same procedure was employed as in Example A, except that the amount of MAO solution employed was 1 mL (2×10$^{-3}$ moles Al), no hydrogen was added, and the reaction was allowed to proceed for 19 min. Polymer yield=38.3 g; flow index=5.1 dg/min; M$_w$=129,100 g/mole; M$_w$/M$_n$=2.4; SCB/1000C (by IR spectroscopy)=48.

Example D

The same procedure was employed as in Example B, except that the amount of MAO solution employed was 0.25 mL (5×10$^{-4}$ moles Al), no hydrogen was added, and the reaction was allowed to proceed for 18 min. Polymer yield=45.7 g; melt index=0.14 dg/min; flow index=12.1 dg/min; M$_w$=104,500 g/mole; M$_w$/M$_n$=2.6; SCB/1000C (by IR spectroscopy)=40.

Gas Phase Polymerization - Stirred Bed (Examples 1–7)

Referring to Table 2 below, in Examples 1–7, polyethylene samples were made using unsupported and supported mixtures of the racemic and meso stereoisomers of Me2Si (2-MeInd)ZrCl$_2$ ("SIZR" and "Sup SIZR", respectively) in a gas phase, stirred bed reactor. Only the bridged metallocene catalysts containing two cycloalkadienyl ligands having facial chirality resulted in polyethylene products having broad Polydispersity Indexes (PDI), narrow comonomer distributions (as measured by the Crystallizable Chain Length Distribtution Index, L$_w$/L$_n$) and long chain branching (LCB).

The gas phase reactor used in each of these Examples consisted of a two-phase (gas/solid) stirred bed reactor in which multiple "plows" were mounted horizontally on a central shaft rotating at 190 rpm to keep the particles in the reactor mechnically fluidized. Gas was continually recirculated through the apparatus.

Starting materials, amounts and conditions for each Example are given in Table 2. The reactor pressure in Examples 1–6 was 300 psi, while in Example 7 the reactor pressure was 350 psi. The ethylene partial pressure in Examples 1–6 was 120 psi, while in Example 7, it was 240 psi.

Ethylene and 1-hexene monomers and hydrogen (for molecular weight control) were fed to the reactor as required to maintain gas composition.

The catalyst compositions were prepared and introduced into the reactor as follows.

Examples 1–4 (unsupported)

In each Example, the catalyst was metered into the reactor as a dichloromethane solution with a continuous stream of modified methylaluminoxane (MMAO) in isopentane solvent (obtained from Ethyl Corp.). The mixed solution feed was sprayed into the reactor by a constant flow of nitrogen. Cocatalyst feed rate was maintained in proportion to the catalyst feed rate.

Examples 5–7 (supported)

Each of the supported catalyst compositions in Examples 5–7 were prepared by first adding to a 500 mL flask equipped with magnetic stirbar under nitrogen atmosphere 250 mL toluene (distilled from Na/benzophenone) and 50.0 g silica (DAVISON 955, previously dried at 600° C.). To this slurry were then added 83.1 g of MAO in toluene (30 weight %). The resulting mixture was stirred for 1 h. To this slurry was then added a solution of 1.17 g Me$_2$Si(2-MeInd)ZrCl$_2$ in 60 mL toluene; the slurry was then stirred an additional ca. 1 h. Next, solvent was removed by placing the flask in an oil bath set at 50° C. and placing under vacuum. From this procedure were recovered 86.9 g of peach-colored powder. ICP analysis showed the catalyst composition to have 2.63× 10$^{-5}$ moles Zr/g and 4.37×10$^{-3}$ moles Al/g. The catalyst composition was subsequently slurried in mineral oil at 20 weight % solids.

In each of these Examples, the resulting slurry was added to the stirred bed reactor with a continuous stream of TiBA scavenger solution. The mixed solution feed was sprayed into the reactor by a constant flow of nitrogen.

Gas Phase Polymerization - Fluid Bed (Examples 8–10 and Comparative Examples E–G)

Referring to Table 3 below, in Examples 8–10 polyethylene samples were made using a catalyst composition comprising a mixture of the racemic and meso stereoisomers of Me$_2$Si(2-MeInd)ZrCl$_2$ supported with MAO on silica in a gas phase, fluid bed reactor. In Comparative Examples E and F polyethylene samples were also made in a gas phase, fluid bed reactor, but the catalyst composition used comprised bis[n-butylcyclopentadienylzirconium dichloride ("BuCp", an unbridged metallocene catalyst), and MAO supported on silica. In Comparative Example G, the catalyst composition comprised diphenylmethylene (cyclopentadienyl)(fluorenyl)zirconium dichloride ("DPZ", a bridged metallocene catalyst containing cycloalkadienyl ligands that do not have facial chirality) and MAO supported on silica.

The bridged metallocene catalysts containing two cycloalkadienyl ligands having facial chirality resulted in polyethylene products having broad Polydispersity Indexes (PDI's), good processability (as measured by (RSI)(MI$^\alpha$) greater than about 26 when α is about 0.7), narrow comonomer distributions (as measured by the Crystalline Chain Length Distribution Index, $L_w/L_n$), and good operability.

Polymerization was conducted in a 14 inch nominal diameter, gas phase, fluidized bed reactor having a bed height of 10 feet. Cycle gas linear velocity was 1.2 to 1.8 ft/sec.

In each of Examples 8, 9 and E–G, reactor temperature was 80° C., while in Example 10 the reactor temperature was 65° C. Total reactor pressure in Examples 8–10, E and F was 350 psi. Total reactor pressure in Example G was 420 psi. Ethylene partial pressure in Examples 8, 9, E, and F was 170 psi, while in Example 10 the ethylene partial pressure was 140 psi, and in Example G the ethylene partial pressure was 150 psi.

The various catalyst compositions were prepared as follows.

Comparative Example E

A 1-gallon jacketed vessel equipped with a helical impeller was charged with 2.3 L nitrogen-sparged toluene and 1.1 L MAO in toluene (30 weight %), followed by 152 g of a solution of 20 g BuCp in ca. 200 mL toluene (obtained from Witco and Albemarle). This solution was stirred under nitrogen for 3 h. At this point, 855 g silica (DAVISON 955, previously dried at 600° C.) were added to the reactor, and the resulting slurry was stirred for approximately 12 h at room temperature. The toluene was removed by placing the vessel under partial vacuum while heating the jacket to ca. 100° C. with a nitrogen sweep over the material. From the vessel were recovered 1.36 kg deep yellow, free-flowing powder. ICP analysis showed the catalyst composition to have $2.5 \times 10^{-5}$ moles Zr/g and $2.4 \times 10^{-3}$ moles Al/g. The catalyst composition was subsequently passed through a sieve with 600 μm mesh aperture and slurried in mineral oil at ca. 25 weight % solids.

Example F

A 1-gallon jacketed vessel equipped with a helical impeller was charged with 2.0 L nitrogen-sparged toluene and 1.456 L MAO in toluene (30 weight %), followed by a solution of 11 g of BuCp in ca. 100 mL toluene. This solution was stirred under nitrogen for 3 h. At this point, 605 g silica (DAVISON 955, previously dried at 600° C.) were added to the reactor, and the resulting slurry was stirred for approximately 12 h at room temperature. The toluene was removed by placing the vessel under partial vacuum while heating the jacket to ca. 100° C. with a nitrogen sweep over the material. From the vessel were recovered 0.82 kg deep yellow, free-flowing powder. ICP analysis showed the catalyst composition to have $3.3 \times 10^{-5}$ moles Zr/g and $5.7 \times 10^{-3}$ moles Al/g. The catalyst composition was subsequently passed through a sieve with 600 μm mesh aperture and slurried in mineral oil at ca. 25 weight % solids.

Example G

A 1-gallon jacketed vessel equipped with a helical impeller was charged with 2.7 L MAO in toluene (30 weight %), followed by 613 g silica (DAVISON 955, previously dried at 600° C.). The resulting slurry was stirred for 5 h at 98° C., then was allowed to cool to ambient temperature over a period of approximately 16 h. Next, a mixture of DPZ (20.2 g), MAO (1.26 moles Al), and toluene (ca. 1 L) was transferred to the slurry; a small additional amount of toluene was required to complete the transfer. The purple slurry was stirred at room temperature for 2 h, then allowed to settle with no agitation for 1.5 h and 125 mL of supernatant were removed. The slurry was then turned into a thick mud by removal of toluene through heating of the sample (jacket temperature reached 84° C.) and placement under partial vacuum; this mud was then allowed to cool below 45° C., at which point ca. 3 L n-pentane (nitrogen-sparged and stored over molecular sieves) was added. After 1 h stirring, the slurry was allowed to settle with no agitation for ca. 14 h. Next, the supernatant solution was removed via cannula, and another 3 L n-pentane was added and the slurry agitated for 0.5 h. The slurry was then allowed to settle again with no agitation for 3 h. The supernatant solution was again removed via cannula, and the remaining mud was reduced to a free-flowing powder by heating and partial vacuum, with a nitrogen sweep over the material. The yield of light purple solid was 1.11 kg. ICP analysis showed the catalyst composition to have $1.6 \times 10^{-5}$ moles Zr/g and $6.1 \times 10^{-3}$ moles Al/g. The catalyst composition was subsequently passed through a sieve with 600 μm mesh aperture and slurried in mineral oil at ca. 25 weight % solids.

Examples 8–10

Each of the catalyst compositions comprising supported $Me_2Si(2-MeInd)ZrCl_2$ ("Sup SIZR") were prepared as follows. A 1-gallon jacketed vessel equipped with a helical impeller was charged with 2.0 L nitrogen-sparged toluene and 2.2 L MAO in toluene (30 weight %), followed by a solution of 23.1 g $Me_2Si(2-MeInd)ZrCl_2$ in 1 L toluene; 200 mL toluene was required to complete the transfer. The red solution was stirred under nitrogen for 3 h. At this point, 859 g silica (DAVISON 955, previously dried at 600° C.) were added to the reactor, and the resulting slurry was stirred for approximately 12 h at room temperature. The toluene was removed by placing the vessel under partial vacuum while heating the jacket to ca. 100° C. with a nitrogen sweep over the material. A light-orange, free flowing powder was recovered from the vessel. The catalyst composition was subsequently passed through a sieve with 600 μm mesh aperture and slurried in mineral oil at ca. 25 weight % solids.

TABLE 1

| | Example | | | |
| --- | --- | --- | --- | --- |
| | A | B | C | D |
| Al/Zr | 500 | 2,000 | 2,000 | 500 |
| MI | 11.1 | 25.3 | — | 0.14 |
| FI | 311 | 720 | 5.1 | 12.1 |
| $M_w$ | 47,500 | 40,900 | 129,100 | 104,500 |
| $M_w/M_n$ | 2.6 | 2.4 | 2.4 | 2.6 |

TABLE 2

| | Example | | | | | | |
|---|---|---|---|---|---|---|---|
| | 1 | 2 | 3 | 4 | 5 | 6 | 7 |
| Catalyst | SIZR | SIZR | SIZR | SIZR | Sup SIZR | Sup SIZR | Sup SIZR |
| Al/Zr | 1000 | 1000 | 1500 | 1500 | 150 | 150 | 150 |
| 1-Hexene/Ethylene | 0.0055 | 0.0055 | 0.0045 | 0.0055 | 0.008 | 0.008 | 0.008 |
| Hydrogen/Ethylene | 0 | 0.0027 | 0.006 | 0.012 | 0.011 | 0.0045 | 0.005 |
| MI | (–) | 0.33 | 0.12 | 2.4 | 7.4 | 1.3 | 0.66 |
| FI | 4.6 | 35 | 17.6 | 167 | 308 | 68 | 44 |
| MFR | N/A | 106 | 147 | 70 | 42 | 52 | 67 |
| Density | 0.918 | 0.920 | 0.918 | 0.927 | 0.922 | 0.919 | 0.920 |
| Mw/Mn | 4.6 | 4.0 | 4.2 | 3.7 | 4.5 | 4.4 | 5.3 |
| LCB/1000C | 0.3 | 0.8 | 0.7 | 0.7 | 0.6 | 0.5 | 0.3 |
| Lw/Ln | – | 2.40 | — | 1.40 | — | 1.40 | 1.70 |
| Cat Activity | 1.7 | 2.1 | 3.2 | 2.6 | 3.4 | 3.6 | 4.5 |

TABLE 3

| | Example | | | | | |
|---|---|---|---|---|---|---|
| | E | F | G | 8 | 9 | 10 |
| Catalyst | BuCp* | BuCp | DPZ | Sup SIZR | Sup SIZR | Sup SIZR |
| 1-Hexene/Ethylene | 0.0185 | 0.0115 | 0.003 | 0.01 | 0.0054 | 0.007 |
| Hydrogen/Ethylene | 0 | 0 | 0.02 | 0.034 | 0.0283 | 0.022 |
| Operability | good | good | poor† | good | good | good |
| Residual Zr, ppm | 4.2 | 1.12 | 2.7 | N/A | N/A | 1.71 |
| Density | 0.922 | 0.918 | 0.917 | 0.917 | 0.928 | 0.9055 |
| FI | 12.7 | 18.9 | 1.5 | 84 | 135 | 130 |
| MI | 0.77 | 1.16 | — | 1.5 | 1.94 | 2.4 |
| MFR | 16.5 | 16.3 | — | 56 | 70 | 55 |
| Mw/1000 | 110.5 | 104.2 | 142.7 | 72.1 | 71.7 | 67.6 |
| Mn/1000 | 51.1 | 33.6 | 25.2 | 20.3 | 15.5 | 16.9 |
| Mw/Mn | 2.16 | 2.34 | 5.66 | 3.55 | 4.63 | 4 |
| LCB/1000C | 0 | 0 | — | 0.7 | 0.8 | 1.5 |
| Lw/Ln | 3.1 | 3 | — | 1.9 | 1.6 | 1.65 |
| (RSI)(MI$^{0.7}$) | 2.38 | | | 29.10 | 43.15 | 37.77 |

*pelleted material used for sample characterization
†continuous operation not feasible due to extensive particle agglomeration

We claim:

1. A process for producing polyethylene, which comprises contacting under gas phase polymerization conditions ethylene and optionally a higher alpha-olefin with an unsupported, liquid catalyst composition comprising:

a) racemic and meso stereoisomers of a bridged metallocene catalyst containing two cycloalkadienyl ligands joined by a bridging linkage and complexed to a metal atom, each cycloalkadienyl ligand having facial chirality, and b) a cocatalyst selected from the group consisting of methylaluminoxane and modified methylaluminoxane, wherein the polyethylene produced has a Polydispersity Index of at least about 3.0, a melt index, MI, and Relaxation Spectrum Index, RSI, such that $(RSI)(MI^\alpha)$ >about 26 when $\alpha$ is about 0.7, a Crystallizable Chain Length Distribution Index, $L_w/L_n$, of less than about 3, and at least about 0.3 long chain branches per 1000 main chain carbon atoms.

2. The process of claim 1, wherein the metal atom is selected from titanium, zirconium and hafnium.

3. The process of claim 1, wherein the bridged metallocene catalyst has the formula:

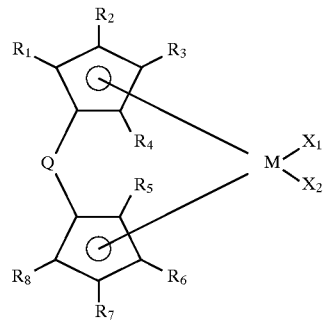

wherein $R_1$ to $R_8$ are the same or different monovalent substituents selected from alkyl, aryl, alkylaryl, arylalkyl, hydrogen, halogen, or hydrocarboxy and any two of $R_1$ to $R_8$ may be connected to form a ring of 4–8 atoms, such that if $R_1=R_4$ then $R_2 \neq R_3$, and if $R_2=R_3$ then $R_1 \neq R_4$, and if $R_5=R_8$ then $R_6 \neq R_7$, and if $R_6=R_7$ then $R_5 \neq R_8$, the symbol "=" denoting both chemical and stereochemical equivalence;

Q is a divalent substituent selected from alkylidene, dialkylsilylene, dialkylgermylene, and cycloalkylidene;

M is transition metal selected from Group 4; and $X_1$ and $X_2$ are the same or different, and are monovalent ligands selected from alkyl, aryl, alkylaryl, arylalkyl, hydrogen, halogen, hydrocarboxy, aryloxy, dialkylamido, carboxylato, thiolato, and thioaryloxy.

4. The process of claim 1, wherein ethylene is copolymerized with a higher alpha-olefin selected from propylene, 1-butene, 1-hexene, 4-methyl-1-pentene, 1-octene and mixtures thereof.

5. The process of claim 1, wherein both the racemic and meso stereoisomers are present during polymerization in an amount greater than about 6 percent by weight of the total weight of the bridged metallocene catalyst.

* * * * *